(12) United States Patent
Tsao et al.

(10) Patent No.: US 8,954,523 B2
(45) Date of Patent: Feb. 10, 2015

(54) METHOD AND APPARATUS FOR IDENTIFYING VIRTUAL CONTENT CANDIDATES TO ENSURE DELIVERY OF VIRTUAL CONTENT

(75) Inventors: Tu Tsao, Palo Alto, CA (US); Nigel Choi, Palo Alto, CA (US); Vinod Kumar Ramachandran, Sunnyvale, CA (US); Ping Wu, Saratoga, CA (US)

(73) Assignee: Google Inc., Mountain View, CA (US)

( * ) Notice: Subject to any disclaimer, the term of this patent is extended or adjusted under 35 U.S.C. 154(b) by 791 days.

(21) Appl. No.: 13/149,446

(22) Filed: May 31, 2011

(65) Prior Publication Data

US 2012/0173654 A1 Jul. 5, 2012

Related U.S. Application Data

(60) Provisional application No. 61/429,404, filed on Jan. 3, 2011.

(51) Int. Cl.
*G06F 15/167* (2006.01)
*G06Q 30/02* (2012.01)

(52) U.S. Cl.
CPC ...................... *G06Q 30/02* (2013.01)
USPC ............................ 709/213; 709/217; 709/219

(58) Field of Classification Search
CPC ................. G06Q 30/0251; G06Q 30/0241
USPC .......................................... 709/213, 217, 219
See application file for complete search history.

(56) References Cited

U.S. PATENT DOCUMENTS

| | | | |
|---|---|---|---|
| 7,356,547 B2 | 4/2008 | Ozer et al. | |
| 7,568,211 B2 | 7/2009 | Mai et al. | |
| 8,660,539 B2 * | 2/2014 | Khambete et al. | 455/414.1 |
| 2008/0155589 A1 * | 6/2008 | McKinnon et al. | 725/34 |
| 2009/0083147 A1 * | 3/2009 | Paila et al. | 705/14 |
| 2009/0198542 A1 * | 8/2009 | D'Amore et al. | 705/7 |
| 2009/0298480 A1 | 12/2009 | Khambete et al. | |
| 2010/0017287 A1 | 1/2010 | Caldwell et al. | |
| 2010/0121712 A1 | 5/2010 | Shahshahani et al. | |
| 2010/0124907 A1 * | 5/2010 | Hull et al. | 455/412.1 |
| 2010/0293049 A1 * | 11/2010 | Maher et al. | 705/14.46 |
| 2010/0293050 A1 * | 11/2010 | Maher et al. | 705/14.46 |
| 2010/0293058 A1 * | 11/2010 | Maher et al. | 705/14.66 |
| 2011/0321167 A1 * | 12/2011 | Wu et al. | 726/26 |
| 2012/0185334 A1 * | 7/2012 | Sarkar et al. | 705/14.58 |
| 2013/0030913 A1 * | 1/2013 | Zhu et al. | 705/14.52 |

* cited by examiner

*Primary Examiner* — Mohamed Wasel
(74) *Attorney, Agent, or Firm* — Birch, Stewart, Kolasch & Birch, LLP.

(57) ABSTRACT

An apparatus and method is provided that ensures virtual content providers such as advertisers that their virtual content will reach every mobile device, every application within each mobile device and/or every user. Such functionality is referred to herein as a "guaranteed reach". Guaranteed reach parameters including reach type parameters (mobile devices, applications and/or users) are specified in a memory. A server receives a virtual content request and a received target identification uniquely identifying, for example, the requesting device via a network. The server identifies virtual content candidates from the memory by comparing the received target identification to the stored target identification associated with the virtual content. The guaranteed reach parameters may also include frequency-based criteria that guarantee a frequency of impression(s) for particular virtual content and guaranteed priority criteria to ensure the guarantee will be met.

22 Claims, 13 Drawing Sheets

FIG. 2a
200a

| Device_ID | Content_ID | Imp_Num |
|---|---|---|
| | | |

FIG. 2b
200b

| Device_ID | App_ID | Content_ID | Imp_Num |
|---|---|---|---|
| | | | |

FIG. 2c
200c

| Device_ID | App_ID | User_ID | Content_ID | Imp_Num |
|---|---|---|---|---|
| | | | | |

| User_ID | Content_ID | Imp_Num |
|---|---|---|
| | | |
| | | |

| User_ID | App_ID | Content_ID | Imp_Num |
|---|---|---|---|
| | | | |
| | | | |

| Req_SEQ | Req_NUM | Imp_MAX | Imp_NUM | Content_Desc | Content_ID | User_ID | App_Desc | App_ID | Device_ID |
|---|---|---|---|---|---|---|---|---|---|
| | | | | | | | | | |

METHOD AND APPARATUS FOR IDENTIFYING VIRTUAL CONTENT CANDIDATES TO ENSURE DELIVERY OF VIRTUAL CONTENT

PRIORITY

The present Application claims benefit of priority to Provisional Application 61/429,404, filed on Jan. 3, 2011 in the United States Patent and Trademark Office, the entire contents of which are hereby incorporated by reference.

TECHNICAL FIELD

The technical field relates to apparatuses and methods for providing virtual content to mobile devices and other computing devices based on information associated with the device itself, applications and browsers stored on the device, and/or users of the device.

BACKGROUND

The popularity of mobile devices such as cellular phones and portable computing devices continues to increase as more users rely on mobile devices to gain accesses to virtual content delivered to the users via a network such as a cellular network or the Internet. As such, virtual content providers are competing with each other to attract more users to their virtual content. For example, "on-line" advertisers are constantly looking for ways to expand the reach of their advertisements to as many mobile devices as possible and thereby increase sales via increased responses to their advertisement content by users.

SUMMARY

A concept of the present invention is to provide technical solutions guaranteeing or at least ensuring that every mobile device or every user of mobile device(s) is exposed to a particular virtual content, which may be any type of virtual content, including, for example, advertisements.

More generally, aspects of the invention ensure virtual content providers that their virtual content will reach every mobile device, every application within each mobile device and/or every user. Such functionality is variously referred to herein as a "guaranteed reach". Given intended applications such as very large scale brokerage systems with many millions of mobile device virtual content platforms and a concomitantly large virtual content inventory, the degree of such "guarantee" may be experienced as an "ensured" delivery system such that not "all" mobile devices are served with a "guaranteed reach" virtual content. The ability to ensure delivery rather than guarantee virtual content delivery may also be effected by conventional auction and/or relevance based virtual content selection systems that may be combined with or otherwise fed virtual content candidates from a guaranteed virtual content delivery system. As such, the various inventive concepts are not inoperable due to the extent that "guaranteed" delivery is not effectuated. Moreover, within the context of this specification "guaranteed" and "ensured" are considered synonymous.

Other aspects of the invention affect the nature of this "guarantee" with guarantee parameters including reach type parameters (mobile devices, applications and/or users). Given a sufficiently long virtual content campaign and regular use of mobile devices by the population, a given virtual content provider could be guaranteed (within a margin of error) that these target audiences (mobile devices, applications and/or users) will be served a particular virtual content for display. Moreover, other aspects of the invention such as guaranteed priority criteria may be utilized to help ensure the guarantee.

Further aspects of the invention expand or refine the reach type parameters with other criteria. Such criteria may be frequency-based such as guaranteeing that the virtual content is served on the Nth request for virtual content and displayed by the mobile device (e.g. the very first request or the third request for virtual content). Another example of a frequency parameter of the guarantee is, for example, that the virtual content is served 3 times within the first 5 requests or 3 times within every Nth request for virtual content (more generally M times every Nth request).

Implementations of the inventive concepts may include an apparatus for identifying virtual content candidates to ensure delivery of virtual content comprising: a memory device storing virtual content, each virtual content being associated with a stored target identification, a content identifier and a number of times served; and a server operatively connected to said memory device, said server receiving a virtual content request and a received target identification from a device via a network, wherein the received target identification uniquely identifies at least one of the device, a user of the device and an application installed on the device making the virtual content request, said server identifying one or more virtual content candidates from the memory device by comparing the received target identification to the stored target identification in the memory device.

In other aspects of the invention, said memory includes frequency-based reach criteria specifying a frequency guarantee for at least one virtual content stored in the memory, said server tracking frequency information relating to an identification frequency of the identified virtual content candidates, said server determining one or more virtual content final candidates from the identified virtual content candidates by comparing the tracked identification frequency information against one or more frequency-based reach criteria.

In other aspects of the invention, said memory includes frequency-based reach criteria specifying a frequency guarantee for at least one virtual content stored in the memory, a virtual content selection engine selecting one or more selection candidates from among the virtual content candidates identified by said server and providing the selection candidates to the device via the network, said server tracking frequency information relating to a selection frequency of the virtual content, said server further identifying the one or more virtual content candidates from the memory by comparing the tracked selection frequency information against one or more frequency-based reach criteria.

In other aspects of the invention, said stored target identification includes a stored device identifier, and said received target identification includes a received device identifier, said server identifying one or more virtual content candidates from the memory by comparing the received device identifier to the stored device identifier.

In other aspects of the invention, said stored target identification includes a stored application identifier, and said received target identification includes a received application identifier, said server identifying one or more virtual content candidates from the memory by comparing the received device identifier and the received application identifier to the stored device identifier and the stored application identifier, respectively.

In other aspects of the invention, said stored target identification includes a stored user identifier, and said received target identification includes a received user identifier, said server identifying one or more virtual content candidates from the memory by comparing the received user identifier to the stored user identifier.

In other aspects of the invention, said stored target identification includes a stored application identifier, and said received target identification includes a received application identifier, said server identifying one or more virtual content candidates from the memory by comparing the received user identifier and the received application identifier to the stored user identifier and the stored application identifier, respectively.

In other aspects of the invention, said stored target identification includes a stored device identifier, and said received target identification includes a received device identifier, said server identifying one or more virtual content candidates from the memory by comparing the received user identifier, the received application identifier, and the received device identifier to the stored user identifier, the stored application identifier, and the stored device identifier, respectively.

In other aspects of the invention, the memory includes a maximum number of times to be served as the frequency-based reach criteria, the number of times served being the tracked identification frequency information.

In other aspects of the invention, the frequency-based reach criteria includes a sequential request number, and the tracked identification frequency information includes a request number.

In other aspects of the invention, said received device identifier may be hashed.

In other aspects of the invention, said virtual content may be advertisement content.

Other implementations of the inventive concepts may include a computer-readable medium having computer-executable instructions, which, when executed by a computer having one or more processors, cause the computer to perform steps of: storing virtual content, each virtual content being associated with a stored target identification, a content identifier and a number of times served; receiving a virtual content request and a received target identification from a device via a network, wherein the received target identification uniquely identifies at least one of the device, a user of the device and an application installed on the device making the virtual content request; and identifying one or more virtual content candidates by comparing the received target identification to the stored target identification.

In other aspects of the invention, said computer-executable instructions, which, when executed by the computer, cause the computer to perform additional steps of: tracking frequency information relating to an identification frequency of the identified virtual content candidates; and determining one or more virtual content final candidates from the identified virtual content candidates by comparing the tracked identification frequency information against one or more frequency-based reach criteria, said frequency-based reach criteria specifying a frequency guarantee for at least one virtual content.

In other aspects of the invention, said computer-executable instructions, which, when executed by the computer, cause the computer to perform additional steps of selecting one or more selection candidates from among the virtual content candidates identified and providing the selection candidates to the device via the network; tracking frequency information relating to a selection frequency of the virtual content; and identifying the one or more virtual content candidates by comparing the tracked selection frequency information against one or more frequency-based reach criteria, said frequency-based reach criteria specifying a frequency guarantee for at least one virtual content.

Other implementations of the inventive concepts may include a method for identifying virtual content candidates to ensure delivery of virtual content, comprising steps of: storing virtual content, each virtual content being associated with a stored target identification, a content identifier and a number of times served; receiving a virtual content request and a received target identification from a device via a network, wherein the received target identification uniquely identifies at least one of the device, a user of the device and an application installed on the device making the virtual content request; and identifying one or more virtual content candidates by comparing the received target identification to the stored target identification.

In other aspects of the invention, the method further comprising steps of: tracking frequency information relating to an identification frequency of the identified virtual content candidates; and determining one or more virtual content final candidates from the identified virtual content candidates by comparing the tracked identification frequency information against one or more frequency-based reach criteria, said frequency-based reach criteria specifying a frequency guarantee for at least one virtual content.

In other aspects of the invention, the method further comprising steps of: selecting one or more selection candidates from among the virtual content candidates identified and providing the selection candidates to the device via the network; tracking frequency information relating to a selection frequency of the virtual content; and identifying the one or more virtual content candidates by comparing the tracked selection frequency information against one or more frequency-based reach criteria, said frequency-based reach criteria specifying a frequency guarantee for at least one virtual content.

In other aspects of the invention, the frequency-based reach criteria includes a maximum number of times to be served, and the tracked identification frequency information includes the number of times served.

In other aspects of the invention, the frequency-based reach criteria includes a sequential request number, and the tracked identification frequency information includes a request number.

Additional aspects of the invention refine the reach or reach type parameters with priority criteria. Such priority criteria may include such things as an auction bid amount or other financial criteria that aids a virtual content engine to select from among virtual content candidates.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given herein below and the accompanying drawings which are given by way of illustration only, and thus are not limitative of the present invention, and wherein:

FIG. 2a to FIG. 2f are diagrams illustrating exemplary database tables according to some embodiments;

DETAILED DESCRIPTION

Figure 1:
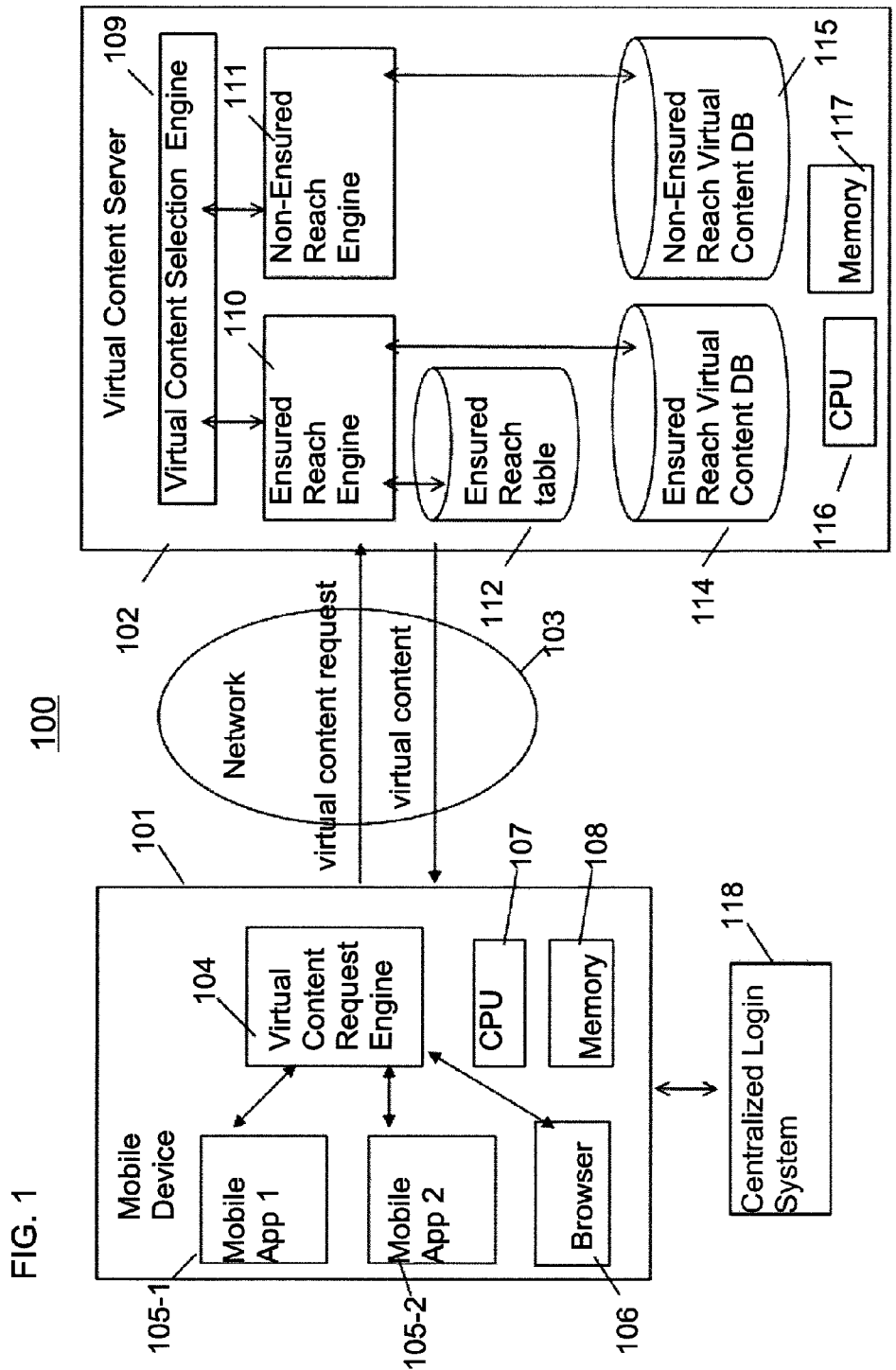
FIG. 1 is a block diagram illustrating an overall system for providing virtual content to mobile devices according to some embodiments.

FIG. 1 is a block diagram illustrating an overall system 100 in which mobile device 101 transmits virtual content requests to, and receives virtual content from, a virtual content server 102 via a network 103, which may be the Internet, a cellular network, a wired network, wireless or other conventional network technology. It is to be understood that, in practice, there will be plural and very likely a very large number of mobile devices 101 connected to the network 103. Also, the virtual content server 102 may be a unitary device but would be preferably be implemented as a server farm or a distributed computing system in order to handle large capacities of virtual content and simultaneous connections with many mobile devices 101.

The mobile devices 101 may include conventional components such as one or more mobile applications 105 (two different apps 105-1 and 105-2 are shown), a browser 106, one or more processors (CPUs) 107, and one or more memories 108. Examples of mobile devices 101 include such known devices as smart phones, tablets, etc but it is to be understood that the device 101 need not be a mobile device and that the inventive concepts apply to other computing devices such as a desktop PC.

Conventional components such as displays, speakers, microphones, connectors, and input devices may also be included in the mobile device 101 as is well known. Aspects of the invention add a virtual content request engine 104 to a conventional device such as a smart phone, tablet or desktop PC. The virtual content request engine 104 may be a part of an application or a browser or independent as illustrated. For example, in some embodiments, the virtual content request engine 104 may be implemented as a script of a webpage.

It is to be understood that the CPU and memory devices (e.g. such as the CPU 107 and memory 108 for the mobile device 101 and/or the CPU 116 and memory 117 for the virtual content server 102) may be arranged as dedicated units each programmed with the functionalities described herein for the various functional units such as the virtual content request engine 104 or may be hardware resources that are shared among multiple functional units. The hardware design choice for such arrangements is governed by routine engineering principles such as size, weight, cost, etc based on components available at the time of implementation. Moreover, the inventive techniques and aspects described herein, although shown in block diagram form, may be implemented using a combination of hardware, firmware and/or software as is known in the art.

The virtual content server 102 may include a virtual content selection engine 109, an ensured reach engine 110, a non-ensured reach engine 111, an ensured reach database 112, an ensured reach virtual content database 114, a non-ensured reach virtual content database 115, one or more processors (CPUs) 116, and one or more memory devices 117.

The virtual content engine 109, the ensured reach engine 110, the non-ensured reach engine 111, the ensured reach database 112, the non-ensured reach database 113, the ensured reach virtual content database 114, and/or the non-ensured reach virtual content database 115 may be part of the virtual content server 102 as illustrated, or independent components in communication with the virtual content server 102.

The ensured reach virtual content database 114 and the non-ensured reach virtual content database 115 may include any type of virtual content, including advertisement content, which is received from one or more virtual content providers (not shown).

The non-ensured reach virtual content database (DB) 115 and the non-ensured reach engine 111 may be implemented with conventional virtual content serving systems. In other words, this section (DB 115 and engine 111) may be a conventional virtual content serving system that provides virtual content candidates in response to a virtual content request. Such conventional virtual content serving systems may use contextual matching (e.g. based on current and/or past search queries, context of publishing page, history, etc) or other algorithms to determine candidates within the content (non-ensured delivery) that may be served in response to the virtual content request. Any and all such conventional or future developed virtual content serving systems and methods are within the scope of this section (DB 115 and engine 111). Moreover, the virtual content selection engine 109 may apply conventional virtual content targeting and/or auction-based algorithms to determine, from among the candidates, which virtual content to serve to a requesting device.

As will be further described below, the DB 115, engine 111 and virtual content selection engine 109 may be considered optional components. In such a case, the ensured reach engine 110 will generate candidates (virtual content candidates) that may be, for example, a) served directly and without further processing to the virtual content request engine 104 or b) sorted for relevance using conventional techniques before serving to virtual content request engine 104.

Unlike the content stored in DB 115, the virtual content stored in ensured reach virtual content database (DB) 114 has an associated ensured reach table or data entity 112 that keeps track of which devices (or apps or users or combinations thereof as explained below in connection with some embodiments) have been served for each virtual content stored in the DB 114. By using such a data entity 112, aspects of the invention can guarantee that a particular virtual content will reach all devices requesting virtual content. In this way, a virtual content can have a guaranteed reach.

The overall system 100 may further include a centralized login system 118, which will be further described below. The centralized login system 118 may be independent from the mobile device 101 and the virtual content server 102 as illustrated, or located within the mobile device 101 or the virtual content server 102.

FIG. 2a to FIG. 2f are exemplary database tables 200a to 200f that may be used to construct the ensured reach data entity 112.

In the embodiment of FIG. 2a, each of the record entries in the ensured reach database table 200a includes a device identifier (Device_ID) field, a virtual content identifier (Content_ID) field, and a number of times served (Imp_NUM) field.

The device identifier field contains a unique identifier that corresponds and uniquely identifies a particular device requesting the virtual content such as mobile device 101 in FIG. 1. The virtual content identifier field contains a unique identifier that corresponds to particular virtual content (e.g. such as an advertisement for a brand name television) stored in virtual content database 109 in FIG. 1. The number of times served field contains a number that corresponds to a number of times that the virtual content (which is associated with the virtual content identifier) has been served to the mobile device (which is associated with the device identifier). More accurately, the Imp_NUM field represents the number of times that the content (identified by Content_ID) has been served so far (since tracking started) to the device (e.g. the mobile device identified by Device_ID).

In the embodiments of FIG. 2b, each of the record entries in the ensured reach database table 200b further includes an application identifier (App_ID) field, in addition to the fields illustrated in FIG. 2a. The application identifier field contains a unique identifier that corresponds and uniquely identifies a particular application program such as a mobile application 105-1 shown in FIG. 1.

It is noted that aspects of the invention also apply to a browser 106 and that there may be multiple browsers (not shown) loaded on the requesting device 101. The "application" identifier may be used to uniquely identify the browser and the process described below is unchanged with respect to such browser(s) 106. In other words, in terms of the various inventive concepts, a browser may be considered an application or at least use the application identifier to identify the browser in the same way that traditional platform-specific applications are handled by the invention as further described herein. Thus, the term "application" is defined herein to include platform-specific applications, cross-platform applications, browsers and any other implemented program on device 101 that is able to request and receive virtual content.

It is also possible that in other aspects of the invention (not shown in the Figures) that each of the record entries in the ensured reach database table 112 may further include a browser identifier (Browser_ID) that corresponds and uniquely identifies a particular browser such as browser 106 shown in FIG. 1. Again, for the sake of simplicity, the term "application" is be used herein synonymously with "browser" for the discussion of the embodiments of the present invention with respect to "application" (i.e., application (browser) identifier).

In the embodiments of FIG. 2c, each of the record entries in the ensured reach database table 200c further includes a user identifier (User_ID) field, in addition to the fields illustrated in FIG. 2b. The user identifier field contains a unique identifier that corresponds and uniquely identifies a particular user.

In the embodiments of FIG. 2d, each of the record entries in the ensured reach database table 200d includes a user identifier (User_ID) field, a virtual content identifier (Content_ID) field, and a number of times served (Imp_NUM) field.

In the embodiments of FIG. 2e, each of the record entries in the ensured reach database table 200e further includes an application identifier (App_ID) field, in addition to the fields illustrated in FIG. 2d.

Generally speaking, the ensured reach table 112 stores a guaranteed (ensured) reach type, a content identifier and a virtual content serving indicator or counter. The guaranteed reach type specifies the extent of the reach across, for example, different types (devices, applications, users or combinations thereof). In other words, guaranteed reach type defines how extensively the virtual content reach will be such as guaranteeing that the virtual content reaches every mobile device (one reach type) or that the virtual content reaches all installed instances of each application (which may include browsers) on a particular mobile device (another reach type).

In the example illustrated in FIG. 2a above, the guaranteed reach type for devices would be the most elegant example wherein the unique device identification field (Device_ID) can be used to track which virtual content (specified by Content_ID) has been served and, optionally, how many times that particular virtual content has been served to that particular device. A single bit would enable tracking whether the content has been served (or selected as a candidate for serving which is also within the inventive concepts) while multiple bits would permit a count of served virtual content. Providing a served virtual content count field instead of a simple indicator enables embodiments of the invention that include frequency guarantees or otherwise guarantee that particular virtual content is served (or selected as a serving candidate) at a desired frequency.

Depending on implementations according to some embodiments, any of the exemplary database tables illustrated in FIG. 2a to FIG. 2e may be modified to include a guaranteed frequency field or fields that specify a frequency at which the virtual content should be identified as a candidate or actually served. Such guaranteed frequency field may include such concepts as guaranteeing that the virtual content is served on the Nth request for virtual content and displayed by the mobile device (e.g. the very first request or the third request). Another example of a frequency parameter of the guarantee is, for example, that the virtual content is served 3 times within the first 5 requests or 3 times within every Nth request (more generally M times every Nth request).

To enable further aspects of the invention, the ensured reach table 112 may be modified to include frequency tracking fields including, but not limited to, one or more of the following fields: a maximum number of times a virtual content is to be served (Imp_MAX) field, a request number (Req_NUM) and a sequential request number (Req_SEQ), M times to be served, Nth request, etc.

For example, in an alternative embodiment of FIG. 2f, each of the record entries in the database table 200f further optionally includes fields such as content description (Content_Desc) field, application description (App_Desc) field, a maximum number of times virtual content to be served (Imp_MAX) field, a request number (Req_NUM) field and a sequential request number (Req_SEQ) field, in addition to the fields illustrated in FIG. 2c. The content description field may contain a brief description of the virtual content (which is associated with the content identifier). The application description field may contain a brief description of the application (which is associated with the application identifier). The maximum number of times virtual content to be served field contains a predetermined number of times to serve a particular virtual content (which is associated with the content identifier). The request number field contains a number of virtual content requests made by the virtual content request engine 104 in FIG. 1. The sequential request number field contains a predetermined sequential number of a request that will be made by the virtual content request engine 104 in FIG. 1.

Figure 3:
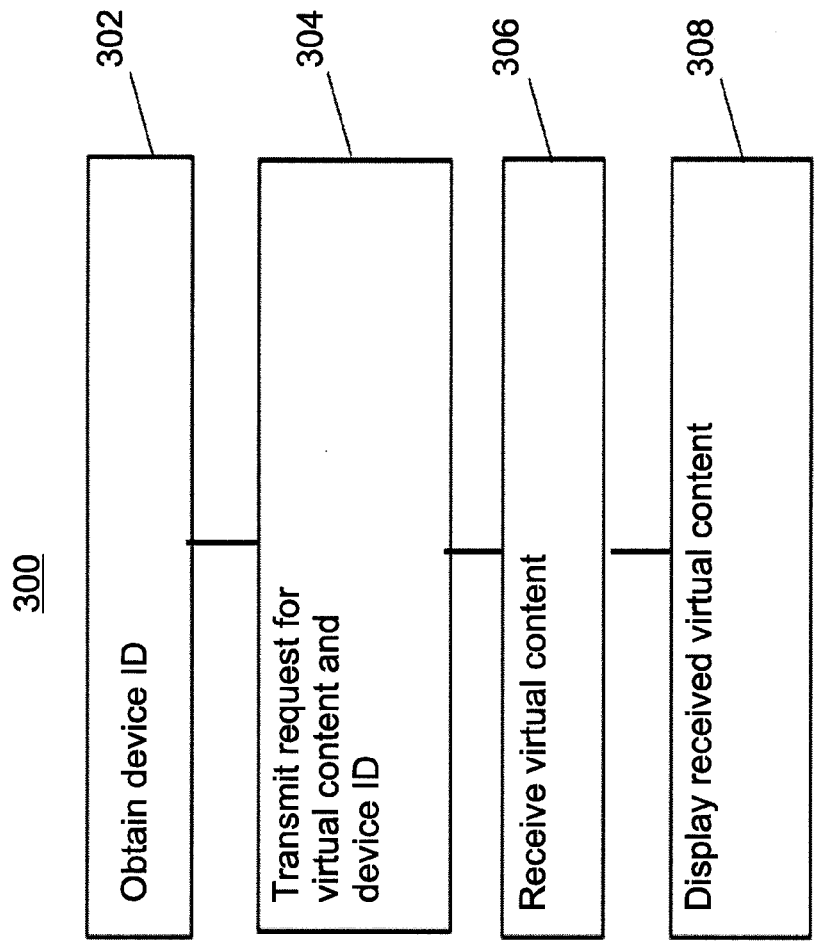
FIG. 3 is a flow diagram illustrating a process for transmitting virtual content request and receiving virtual content by a mobile device according to some embodiments.

FIG. 3 illustrates a flow diagram for a process 300 of requesting and receiving virtual content by a mobile device 101 according to some embodiments. The process 300 may be implemented by the virtual content request engine 104 in FIG. 1. Although shown separately, the virtual content request engine 104 may be a separate application or may be implemented as a piece of code that is included in the mobile applications 105 and/or browser 106. For example, in some embodiments, the virtual content request engine 104 may be implemented as a script of a webpage.

At step 302, in some embodiments, when a mobile application 105 installed on the mobile device 101 is invoked by a user or a browser 106 is launched then the virtual content request engine 104 operates to obtain a device identifier, which is a permanent and unique identifier of the mobile device. More generally, whenever virtual content is requested (e.g. such as when rendering a publisher page having space for virtual content) the virtual content request engine 104 implements the process 300 shown in FIG. 3.

In current conventional technology, mobile devices 105 already have a device identifier stored therein. In some embodiments, the mobile devices 105 may provide the device identifier to the virtual content request engine. Alternatively, the virtual content request engine 104 obtains (accesses or otherwise reads) the mobile device identifier. Desktop devices do not typically include such a device identifier in the same way that is common to a typical mobile device but it is also possible that desktop devices and other network-enabled devices may have or may be provided with a device identifier and that such a device identifier could be made available to the virtual content request engine 104 when executing step 302.

It is important to note that any or all of the unique identifiers (e.g. mobile device identifier, application identifier and particularly a unique identifier to uniquely identify a user) are preferably processed with a hash function, such as one-way MD5 hash, by the virtual content request engine 104. The hashing or other equivalent (conventional) process is preferred because it protects confidential information and provides anonymity.

In this preferred embodiment, when the virtual content server 102 receives the hashed identifier (device, user and/or application), the ensured reach server 102 is prevented from obtaining specific identity information of the device, user and/or application and is allowed only to use the hashed identifier to uniquely identify the device, user and/or application from each other. Thus, by processing the obtained identifier (device, user and/or application) with a hash function, individual users are protected through removal of specific identity information of a device, a user or an application program. These features are particularly important (although not strictly necessary for nominal operation) with respect to the user identification information.

At step 304, the virtual content request engine 104 transmits a virtual content request and either the raw or hashed version of identifier information (guaranteed reach type parameter such as device identifier, app identifier and/or user identifier) to the ensured reach server 102.

At step 306, depending on the processing result of the virtual content server 102, which will be explained in detail later, the mobile device 101 receives virtual content from the virtual content server 102 and displays (308) the received virtual content using the mobile application 105 or browser 106.

Figure 4:
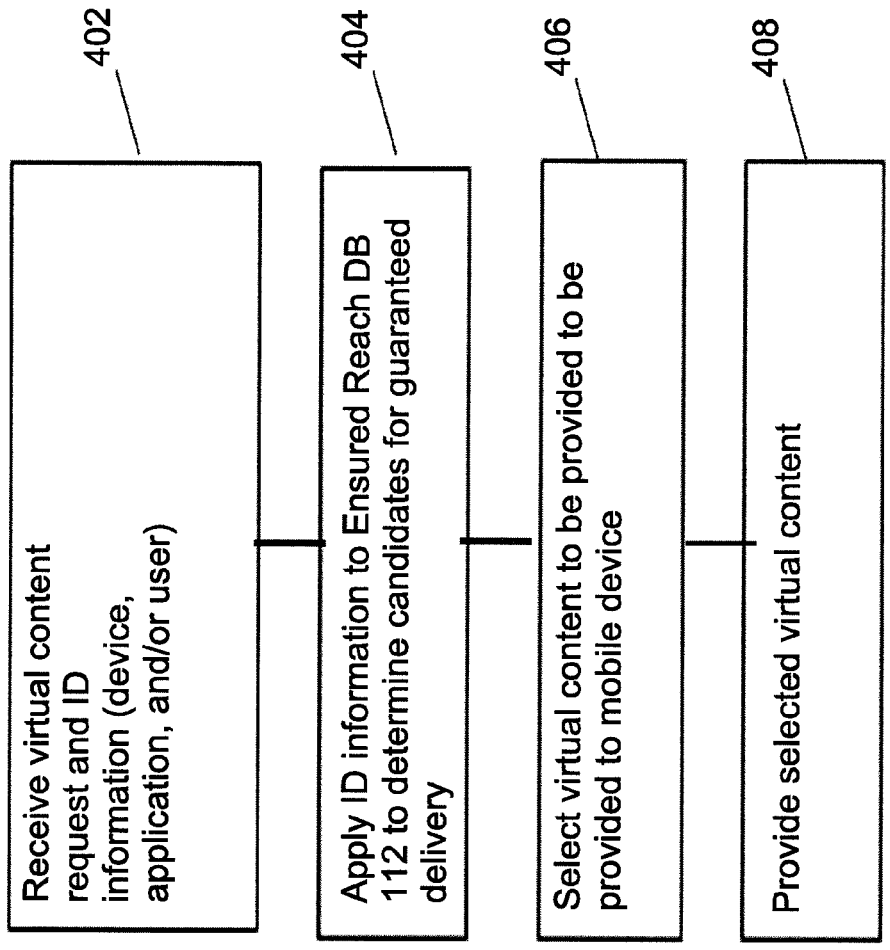
FIG. 4 is flow diagram illustrating a process for receiving a virtual content request and providing virtual content by a server according to some embodiments.

FIG. 4 illustrates a flow diagram for an exemplary process 400 of receiving a virtual content request and providing virtual content by a virtual content server 102. The process 400 may be implemented by virtual content server 102 including the ensured reach engine 110 (steps 402 and 404) and the virtual content selection engine 109 (steps 408 and 410).

At step 402, the ensured reach engine 110 receives from a mobile device 101*a* virtual content request and identifier information, which may include one or more of a device identifier, an application identifier, and a user identifier.

At step 404, the ensured reach engine 110 applies the received identification information to the ensured reach table 112 to determine virtual content candidates for guaranteed delivery. For example, let's assume the ensured reach table 112 is as shown in FIG. 2*a* and the identification information is the device ID of a mobile device 101. The received mobile device ID of device 101 is compared against the ensured reach table 200*a*. Each virtual content (as identified by Content ID) which has not yet been served to that mobile device 101 will have a zero for a number of times served (Imp_NUM=0) or otherwise there will be no record entry for the Device_ID for certain ones of the virtual content. In other words, by using the ensured reach table 200*a*, in this example, the ensured reach engine 110 can identify virtual content that has never been served to the mobile device. Any such virtual content is considered by this embodiment to be a candidate (candidate virtual content).

More specifically, the ensured reach engine 112 implements the method steps 402 and 404 as outlined in FIG. 4 with the result being one or more candidates (virtual content candidates). The outputs of the ensured reach engine 110 and the non-ensured reach engine 111 are candidates for serving to the requesting device 101.

More specifically, a virtual content selection engine 109 may be used to implement step 406 shown in FIG. 4 to select from among the candidates (ensured reach virtual content and non-ensured reach virtual content) the virtual content that will actually be served to the requesting device 101. There are various options according to the invention for selecting (406) which candidate(s) are selected for serving to the requesting device 101.

In a first selection (406) option, the virtual content selection engine 109 may input the candidates from step 404 (the never before seen by that device, app and/or user) and select all the candidates which are provided (408) to the requesting device 101. However, there may be a large number of such candidates and none may be relevant. In a second selection (406) option, therefore, the virtual content selection engine 109 may input the candidates from step 404 and then apply conventional techniques such as auction based algorithms and/or relevancy-based techniques to perform the selection process 406 and provide (408) the selected one or more virtual content to the mobile device 101 via network 103.

In a second selection (406) option, the virtual content selection engine inputs the candidates from both the non-ensured reach engine (111) and the candidates from the ensured reach engine 110. In this variation, the virtual content candidates from the non-ensured reach DB may be obtained by engine 111 in the conventional fashion (as briefly described herein) and those conventional virtual content candidates may then be combined with the guaranteed reach candidates with the combined candidates then subjected to conventional techniques such as auction based algorithms and/or relevancy-based techniques to perform the selection process 406 and provide (408) the selected one or more virtual content to the mobile device 101 via network 103.

Alternatively, the virtual content selection engine 109, in selection process 406, may input the candidates from step 404 and then utilize guaranteed priority information associated with each virtual content as a factor in selecting which candidates should be served. In some implementations, the guaranteed priority information may include an auction price. Moreover, the auction price may have the same or different granularity as the guaranteed reach type and/or guaranteed frequency information in order to effectuate, for example, a particular campaign for a certain virtual content or a specified virtual content delivery campaign.

Also, the guaranteed priority information may include a priority level (e.g., between 0.0 and 1.0) of the candidates. For example, if a particular virtual content candidate has been ensured or guaranteed to appear on the 5th request for virtual content (i.e., sequential request number (Req_SEQ)=5), then on 5th request for virtual content (i.e., request number (Req_NUM)=5), this particular content candidate has the highest priority level (e.g., 1.0) because the virtual content selection engine 109 will have to choose this particular virtual content irrespective of other selection factors, such as auction prices of the candidates. For the 1st to 4th request for virtual content (i.e., request number (Req_NUM)=1 to 4), this particular content candidate then have a priority level of less than 1.0.

Step 406 above describes a staged (or layered) approach in utilizing the ensured reach engine 112, the non-ensured reach engine 110, and the selection engine to perform the selection process. Alternatively, step 406 can be implemented in a non-staged approach, in which the ensured reach engine 112, the non-ensured reach engine 110, and the selection engine are a single entity.

Next, some particular embodiments implementing steps 402, 404 and 406 will be described in view of FIG. 5 to FIG. 10 below.

Aspects of the invention focus upon guaranteeing the reach of certain virtual content (e.g. content for which the virtual content provider may have paid a service premium for guaranteed reach delivery). Such content is variously referred to herein as "ensured reach content" or "guaranteed reach content". There remains a host of other virtual content for which there is no such guaranteed reach service and such content may be stored in the DB 115 as shown in FIG. 1. Such content is "non-ensured reach" content and may be selected as candidates for serving by the non-ensured reach engine 111 and virtual content selection engine 109 and served based on conventional techniques such as auction based algorithms and/or relevancy-based techniques.

Figure 5:
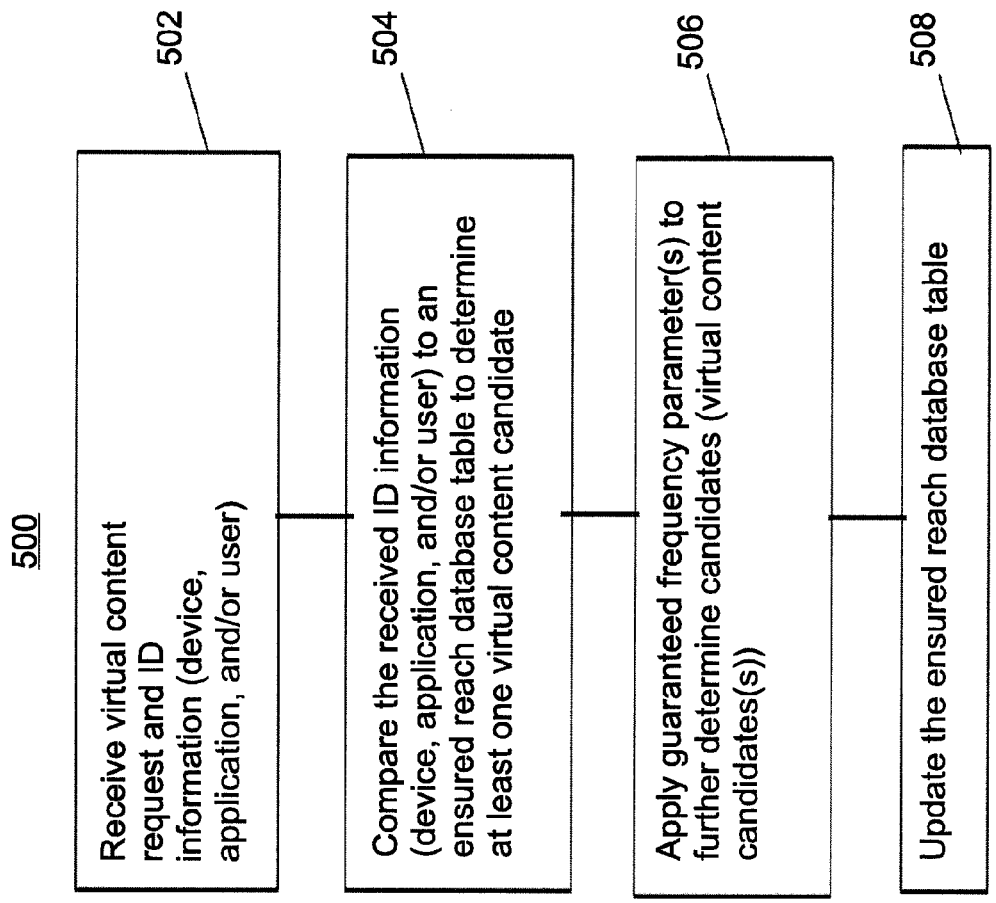
FIG. 5 to FIG. 10 are flow diagrams illustrating processes for receiving a virtual content request and determining virtual content candidates by a server according to some embodiments.

FIG. 5 illustrates a more detailed flow diagram for an exemplary process 500. The ensured reach engine 110, in some embodiments, implements the process 500 and utilizes the ensured reach table 112 and the ensured reach content DB 114. Process 500 is similar to process steps 402 and 404 in process 400 but also adds the concept of guaranteed frequency to expand the pool of guaranteed reach virtual content. After step 508, virtual content selection engine 109 may then select virtual content (from among the expanded candidate pool) using one of the variations of step 406 as described above.

At step 502, the ensured reach engine 110 receives a virtual content request and identifier information (device, application and/or user) from a requesting (mobile) device 101.

At step 504, the ensured reach engine 110 compares the received identifier information to an ensured reach database table in the ensured reach database 112, such as ones illustrated in FIGS. 2a to 2f, to identify at least one virtual content candidate for the received identifier information. In some implementations, step 504 determines (via a comparison process) all of the virtual content that has never been served to the requesting mobile device 101. Each such never-before-seen virtual content is considered to be a candidate (virtual content candidate) but, in some aspects, this pool of candidates may be expanded to include other virtual content for guaranteed reach.

For example, in the first processing stage, the ensured reach engine 110 applies guaranteed reach type parameters (step 504) that include device identifier, application identifier and/or user identifier) to determine candidates (candidate virtual content). Furthermore, the virtual content from DB 114 and the candidates from step 504 may be subjected to further inventive processing such as in step 506 to expand the pool of candidates (before being fed to the selection process (406) which makes the final selection of which candidate(s) will be provided (408) to the requesting device 101.

In step 506, the ensured reach engine 110 may optionally apply other guarantee parameters to further determine candidates (candidate virtual content). The other guarantee parameters include frequency guarantee parameters. As mentioned above, the ensured reach table 112 may include a guaranteed frequency field or fields that specify a frequency at which the virtual content should be identified as a candidate or actually served. Such guaranteed frequency field may include such concepts as guaranteeing that the virtual content is served on the Nth request for virtual content and displayed by the mobile device (e.g. the very first request or the third request for virtual content). Another example of a frequency parameter of the guarantee is, for example, that the virtual content is displayed 3 times within the first 5 requests or 3 times within every Nth request (more generally M times every Nth request).

The ensured reach engine 110 implements step 506 by applying the tracking information to the guarantee parameters in order to further determine the candidates (virtual content candidates). Generally, step 506 will expand the size of the candidate pool since the candidates identified so far are those which have never been served (or selected as a candidate) to the requesting device 101. The frequency guarantee will identify virtual content (via Content_ID) from the ensured reach DB as a candidate when the ensured reach engine 110 matches the frequency guarantee specified in the ensured reach table with tracked frequency information (e.g. a virtual content that has already been served once but for which there is a guarantee to serve at the 3rd request may also be virtual content candidate depending upon the tracked frequency information at the time of the virtual content request)

The frequency guarantee implemented by Step 506 may also select out those virtual content candidates not meeting the criteria specified therein (e.g. not yet the Nth request of M times to be served) and pass along any surviving candidates.

At step 508, the ensured reach virtual content database 114 is updated with any changes after performing step 506 above. For example, when the ensured reach engine 110 applies frequency guarantee parameters to further determine candidates (candidate virtual content), the tracking information relating to the applied frequency guarantee parameters may be updated in the ensured reach table 112.

Next, some embodiments implementing the process 500 in FIG. 5 will be described in view of FIG. 6 to FIG. 10 below.

Figure 6:
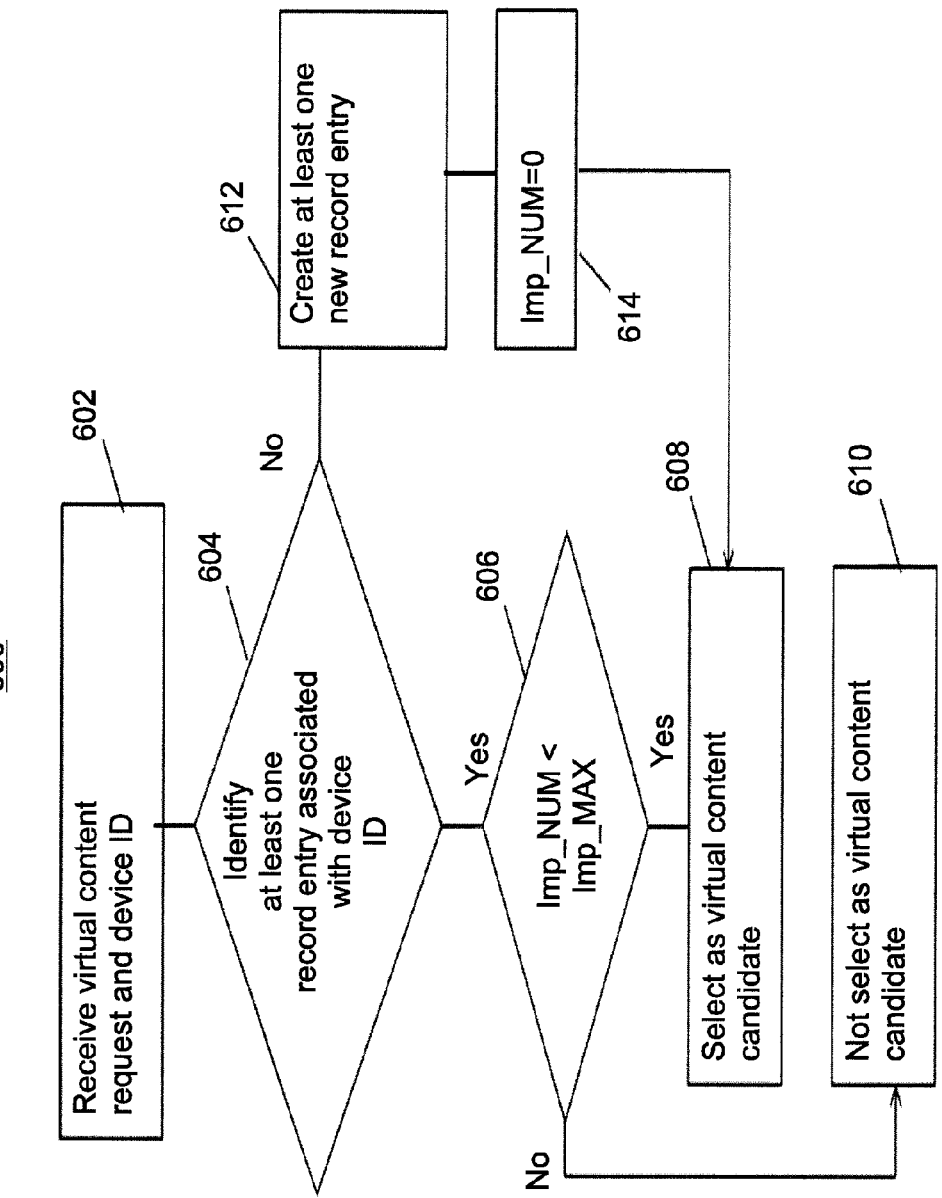

In the embodiments of FIG. 6, the process 600 may be implemented by an ensured reach engine 110. At step 602, the ensured reach engine 110 receives a request for virtual content and a device identifier from a mobile device 101.

At step 604, an ensured reach database 112 is searched to identify one or more record entries associated with the received device identifier. If one or more record entries associated with the device identifier are identified, at step 606, the ensured reach engine 110 applies a frequency guarantee parameter (Imp_MAX) to further determine virtual content candidates based on the identified one or more record entries. Specifically, the ensured reach engine 110 compares the value of a number of times served (Imp_NUM) field with the value of a maximum number of times to be served (Imp_Max) field in an identified record entry. If the value of the number of times served (Imp_NUM) field is smaller than the value of the maximum number of times to be served (Imp_Max) field in the identified record entry, the virtual content associated with the identified record entry is identified as a virtual content candidate at step 608. However, if the value of the number of times served (Imp_NUM) field is greater than or equal to the value of the maximum number of times to be served (Imp_Max) field, the virtual content associated with the identified record entry is not identified as a virtual content candidate at step 610. Steps 606, 608 and 610 are repeated when there are more than one identified record entries that include a value in the maximum number of times to be served (Imp_MAX) field.

On the other hand, if no record entry associated with the device identifier is identified, one or more new record entries are created with the device identifier and virtual content identifiers in the ensured reach database 112 at step 612. The value of the number of times served (Imp_NUM) field in the new record entries are initialized to 0 at step 614. Because no record entry associated with the device identifier is identified, it is determined that the mobile device having the received device identifier has not yet been served with the virtual content stored in the ensured reach virtual content database 114. As such, the process proceeds to step 608 to identify the virtual content of the new entry records as virtual content candidates. As discussed previously, the virtual content candidates by the ensured reach engine 110 may be provided to the virtual content engine 109 to select the virtual content to be actually delivered to the mobile device. Again, the specifics of the selection process by the virtual content engine 109 are outside the primary scope of concepts of the present invention, and thus, will not be discussed further in detail. It is noted that if a virtual content candidate identified by the ensured reach engine 110 is selected and provided to the mobile device 101, the value of the number of times served (Imp_NUM) field in the record entry associated with the virtual content candidate is incremented by 1.

By utilizing the exemplary embodiment illustrated by FIG. 6, virtual content providers are ensured that their particular virtual content will reach to every mobile device for a predetermined number of times (which equal to the value of Imp_MAX field in a record entry for the device identifier of the mobile device), provided that the mobile device is used as many times as the predetermined number of times to invoke the virtual content request engine 104 as described in FIG. 3 above.

Figure 7:
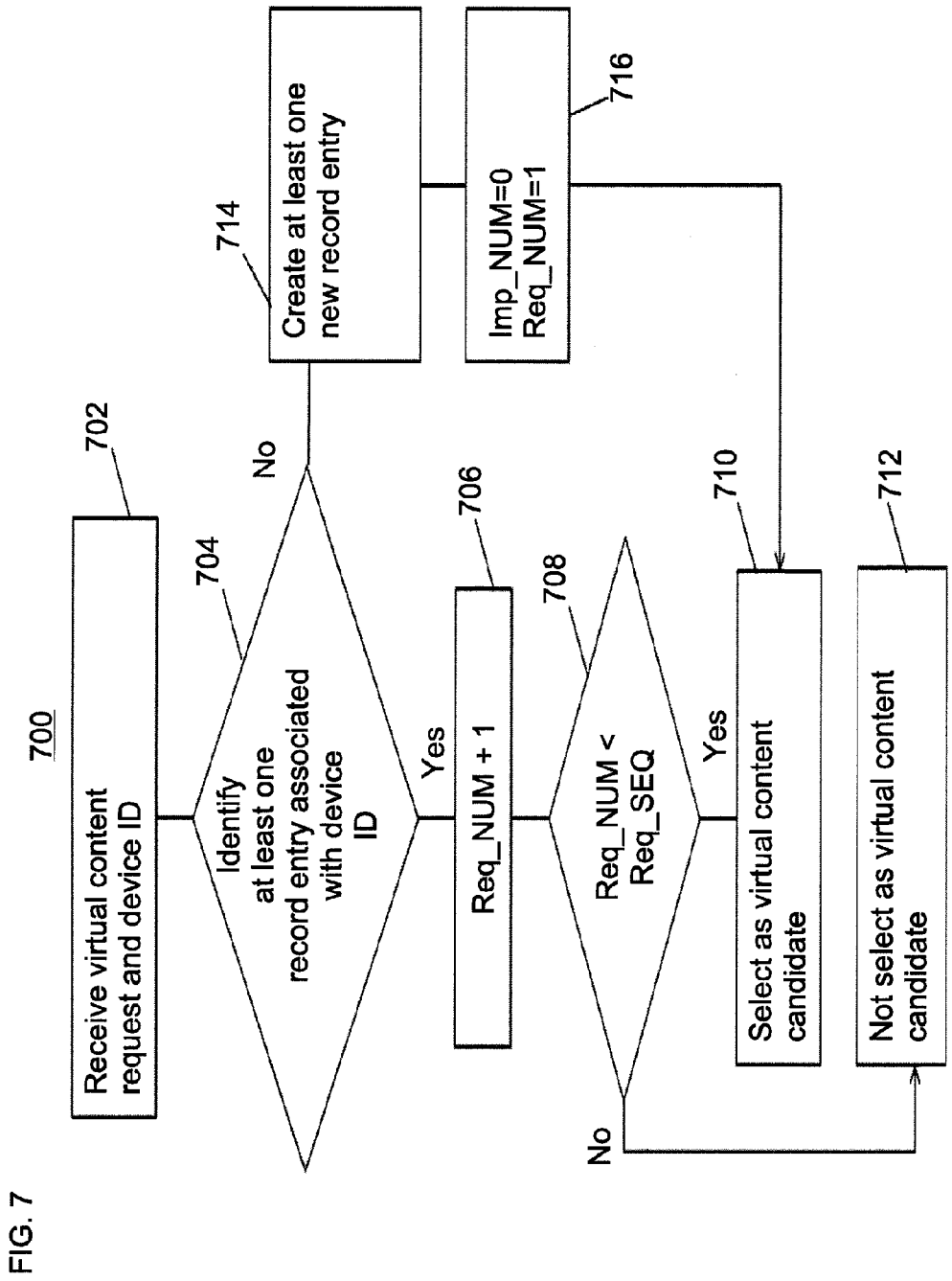

In the embodiments of FIG. 7, the process 700 may be implemented by an ensured reach engine 110. At step 702, an ensured reach engine 110 receives a request for virtual content and a device identifier from a mobile device 101.

At step 704, an ensured reach database 112 is searched to identify one or more record entries associated with the received device identifier. If one or more record entries associated with the device identifier is identified, at step 706, the value of a request number (Req_NUM) field is incremented by 1 in an identified record. At step 708, the ensured reach engine 110 applies a frequency guarantee parameter (Req_SEQ) to further determine virtual content candidates based on the identified one or more record entries. Specifically, the ensured reach engine 110 compares the incremented value of the request number (Req_NUM) with the value of the sequential request number (Req_SEQ) in the identified record entry. If the value of the request number (Req_NUM) field is smaller than the value of the sequential request number (Req_SEQ) field, the virtual content associated with the identified record entry is identified as a virtual content candidate at step 710. However, if the value of the request number (Req_NUM) field is greater than or equal to the value of the sequential request number (Req_SEQ) field, the virtual content associated with the identified record entry is not identified as a virtual content candidate at step 712. Steps 706, 708, 710 and 712 are repeated when there are more than one identified record entries that include a value in the sequential request number (Req_SEQ) field.

On the other hand, if no record entry associated with the device identifier is not identified, one or more new record entries are created with the device identifier and virtual content identifiers in the ensured reach database 112 at step 714. The value of the number of times served (Imp_NUM) field is initialized to 0 and the value of the request number (Req_NUM) field is initiated to 1 in each of the new record entries at step 716. Because no record entry associated with the device identifier is identified, it is determined that the mobile device having the received device identifier has not yet been served with the virtual content stored in the ensured reach virtual content database 114. As such, the process proceeds to step 710 to identify the virtual content of the new records as virtual content candidates. As discussed previously, it is noted that if a virtual content candidate identified by the ensured reach engine 110 is selected and provided to the mobile device 101, the value of the number of times served (Imp_NUM) field in the record entry associated with the virtual content candidate is incremented by 1.

By utilizing the exemplary embodiment illustrated by FIG. 7, virtual content providers are ensured that their particular virtual content will be shown within the first N requests (which is the value of Req_SEQ field in a record entry for the device identifier of the mobile device).

Figure 8:
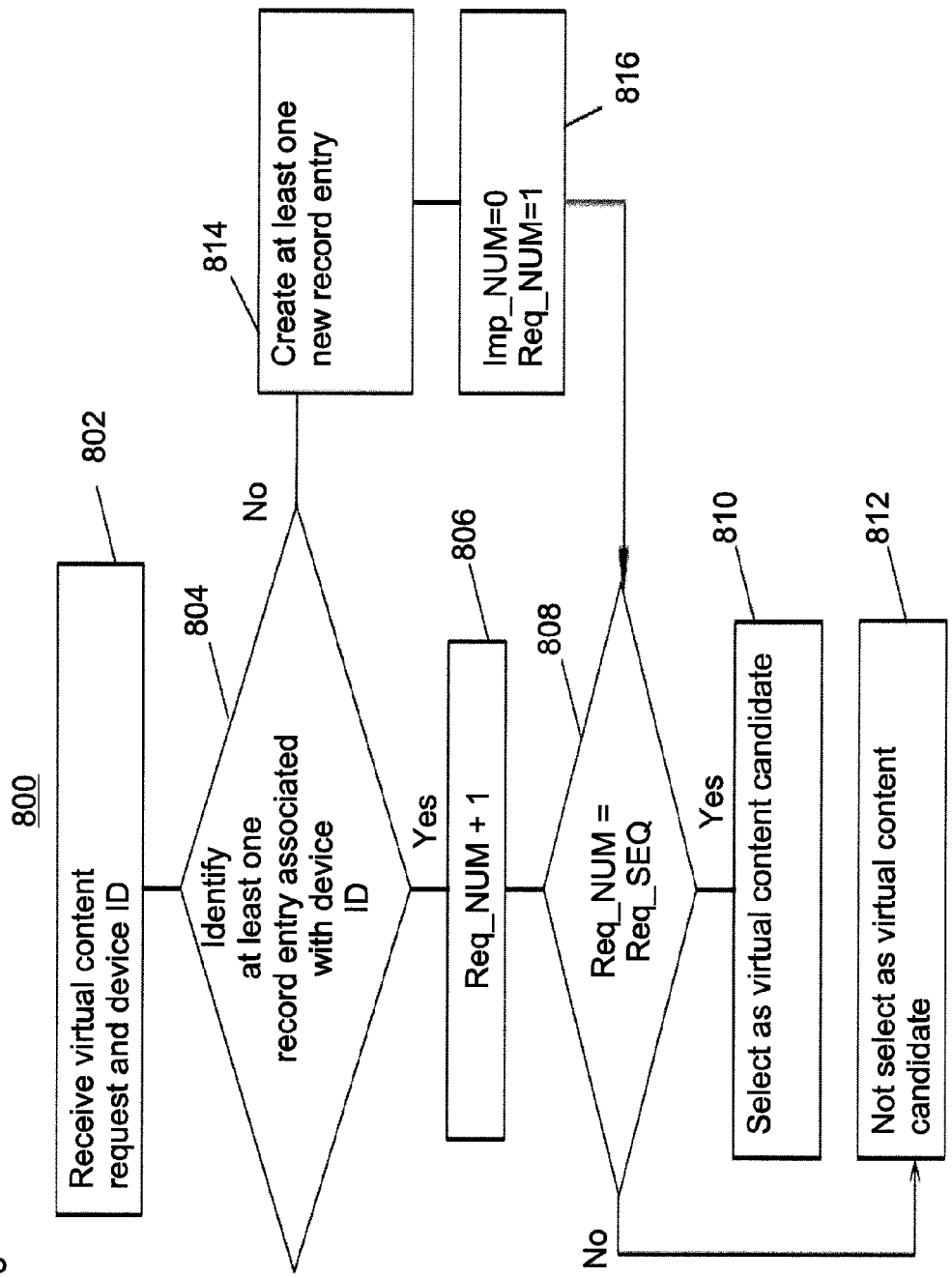

In the embodiments of FIG. 8, the process 800 may be implemented by an ensured reach engine 110. Steps 802, 804, 806, 810, 812, 814 and 816 are performed in the same manner as steps 702, 704, 706, 710, 712, 714 and 716 in FIG. 7 above, respectively, and thus, description of which will not be repeated here. At step 808, the ensured reach engine 110 applies a frequency guarantee parameter (Req_SEQ) to further determine virtual content candidates based on the identified one or more record entries. Specifically, the ensured reach engine 110 compares the incremented value of the request number (Req_NUM) with the value of a sequential request number (Req_SEQ) in the each identified record entry. If the value of the request number (Req_NUM) field is equal to the value of the sequential request number (Req_SEQ) field, the virtual content associated with the each identified record entry is identified as a virtual content candidate.

While step 816 is performed in the same manner as step 716, which initializes the value of the number of times served (Imp_NUM) field to 0 and the value of the request number (Req_NUM) field to 1 in each of the new record entries, the process proceeds to step 808 to compare the value of the request number (Req_NUM=1) field with the value of a sequential request number (Req_SEQ) field for determining whether or not to select the virtual content associated with the each of new record entries as a virtual content candidate.

By utilizing the exemplary implementation illustrated by FIG. 8, virtual content providers are ensured that their particular virtual content will be shown exactly at Nth request (which is the value of Req_SEQ field in a record entry for the device identifier of the mobile device).

Figure 9:
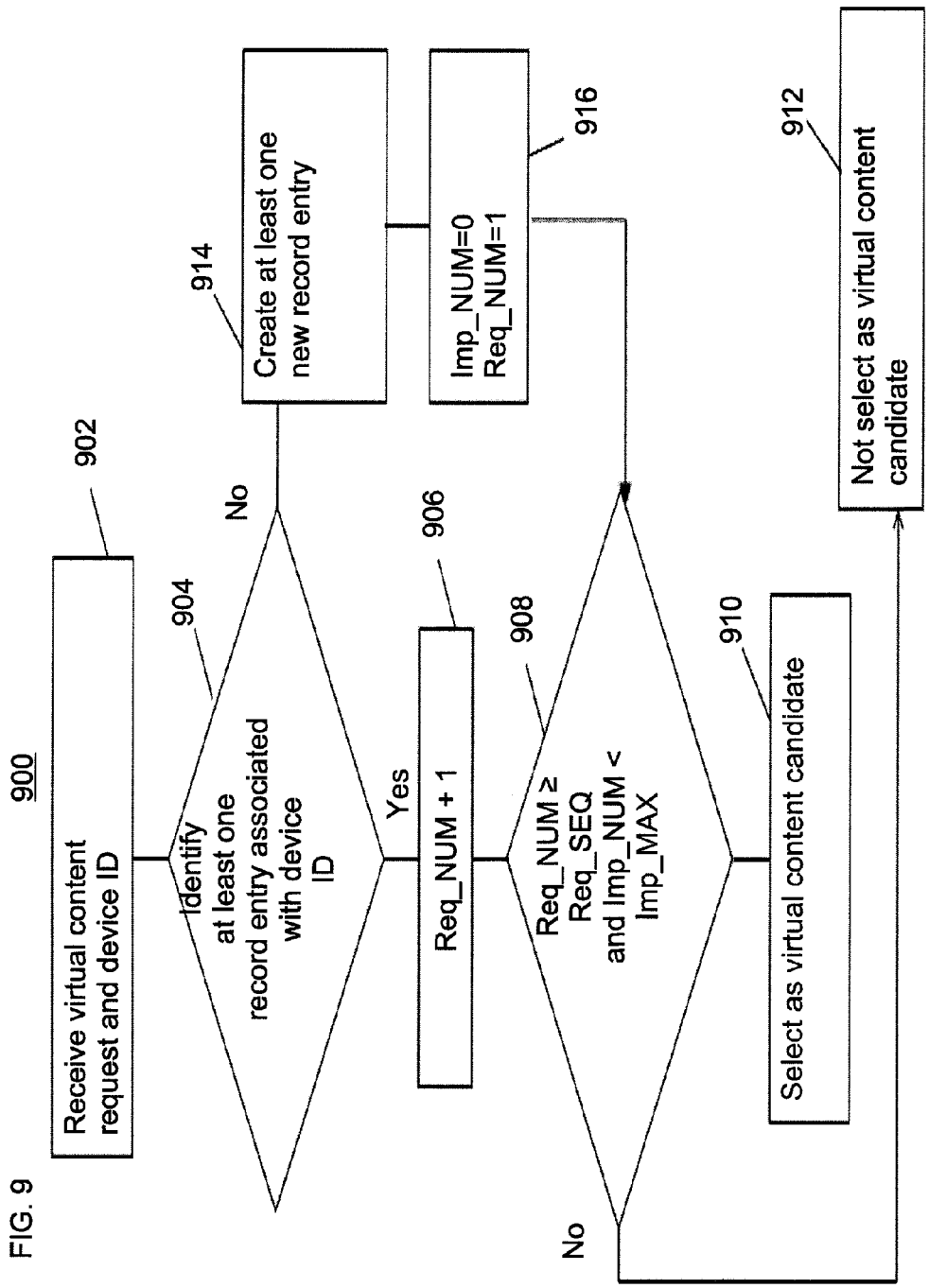

In the embodiments of FIG. 9, the process 900 may be implemented by an ensured reach engine 110. Steps 902, 904, 906, 910, 912, 914 and 916 are performed in the same manner as steps 702, 704, 706, 710, 712, 714 and 716 in FIG. 7 above, respectively, and thus, description of which will not be repeated here. At step 908, the ensured reach engine 110 applies frequency guarantee parameters (Req_NUM and Imp_MAX) to further determine virtual content candidates based on the identified one or more record entries. Specifically, the ensured reach engine 110 compares the incremented value of the request number (Req_NUM) field with the value of a sequential request number (Req_SEQ) field, and compares the value of the number of times served (Imp_NUM) field with the value of the maximum number of virtual content to be served (Imp_MAX) field in the each identified record entry. If the value of the request number (Req_NUM) field is greater than or equal to the value of the sequential request number (Req_SEQ) field and the value of the number of times served (Imp_NUM) field is smaller than the value of the maximum number of times virtual content to be served (Imp_MAX) field, the virtual content associated with the each identified record entry is identified as a virtual content candidate.

While step 916 is performed in the same manner as step 716, which initializes the value of the number of times served (Imp_NUM) field to 0 and the value of the request number (Req_NUM) field to 1 in each of the new record entries, the process proceeds to step 908 to compare the value of the request number (Req_NUM=1) field with the value of a sequential request number (Req_SEQ) field for determining whether or not to select the virtual content associated with the each of new record entries as a virtual content candidate.

By utilizing the exemplary implementation illustrated by FIG. 9, virtual content providers are ensured that their particular virtual content will be served M times (which is the value of the Imp_MAX field in a record entry for the device identifier of the mobile device) starting from Nth request (which is the value of the Req_SEQ field in the record entry).

Figure 10:
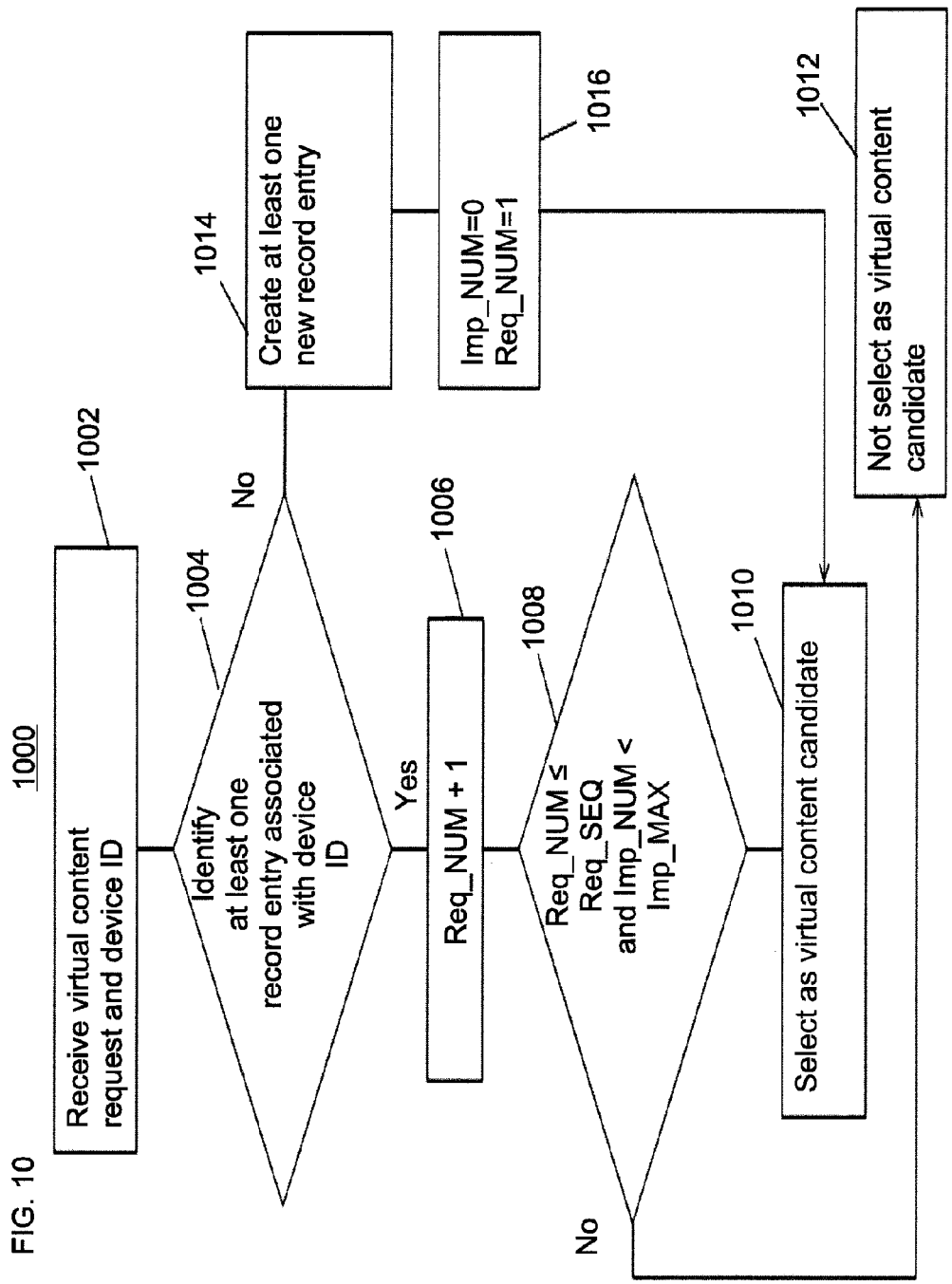

In the embodiments of FIG. 10, the process 1000 may be implemented by an ensured reach engine 110. Steps 1002, 1004, 1006, 1010, 1012, 1014 and 1016 are performed in the same manner as steps 702, 704, 706, 710, 712, 714 and 716 in FIG. 7 above, respectively, and thus, description of which will not be repeated here. At step 1008, the ensured reach engine 110 applies frequency guarantee parameters (Req_NUM and Imp_MAX) to further determine virtual content candidates based on the identified one or more record entries. Specifically, the ensured reach engine 110 compares the incremented value of the request number (Req_NUM) is compared value of a sequential request number (Req_SEQ), and compares the value of the number of times served (Imp_NUM) field with the value of the maximum number of times virtual content to be served (Imp_MAX) field in the each identified record entry. If the value of the request number (Req_NUM) field is smaller than or equal to the value of the sequential request number (Req_SEQ) field and the value of the number of times served (Imp_NUM) field is smaller than the value of the maximum number of times virtual content to be served (Imp_MAX) field, the virtual content associated with the each identified record entry is identified as a virtual content candidate.

In order to ensure that the maximum number of times virtual content to be served (Imp_MAX) will be satisfied in the process 1000, the set value of the sequential request number (Req_SEQ) field is greater than or equal to the set value of the maximum number of times virtual content to be served (Imp_MAX) field in a record.

By utilizing the exemplary implementation illustrated by FIG. 10, virtual content providers are ensured that their particular virtual content will be served M times (which is the value of the Imp_MAX field in a record entry for the device identifier of the mobile device) within the Nth request (which is the value of the Req_SEQ field in the record entry).

Furthermore, modifications to the embodiments described with respect to FIG. 3, and FIG. 6 to FIG. 10 will be discussed.

In the embodiments described with respect to FIG. 3, and FIG. 6 to FIG. 10, only a device identifier is obtained and utilized by the exemplary processes in the figures. Alternatively, when a user invokes a mobile application 105 (or browser 106) installed on a mobile device 101, a device identifier and an application identifier for the application 105 (or browser 106), are obtained and utilized in the same manner as the exemplary processes described with respect to FIG. 3, and FIG. 6 to FIG. 10 above.

As discussed above with respect to FIG. 3, one or both of the obtained device identifier and application identifier is preferably processed with a hash function by the virtual content request engine 104 in order to protect individual users by removing specific identity information of a device, a user or an application program.

By utilizing a device identifier and an application identifier, the same advantageous aspects discussed with respect to FIG. 3 and FIG. 6 to FIG. 10 above is applicable to every installed instance of a mobile application (or a browser) in a mobile device. For instance, by utilizing a device identifier and an application identifier in the exemplary process 600 illustrated in FIG. 6, virtual content providers are ensured that their particular virtual content will reach to every installed instance of a mobile application for a predetermined number of times.

Another modification to the embodiments described with respect to FIG. 3, and FIG. 6 to FIG. 10 is to use a user identifier instead of a device identifier. When a user logs into an account on a mobile application 105 or a browser 106, a virtual content request engine 104 obtains the user identifier. The user identifier is utilized in the same manner as the exemplary processes described with respect to FIG. 3, and FIG. 5 to FIG. 9 above.

In some instances, a user may have different user identifiers (i.e. login names) for using different applications on the mobile device 101. As a result, a user may not be uniquely identified by the different user identifiers for the same user.

Figure 11:
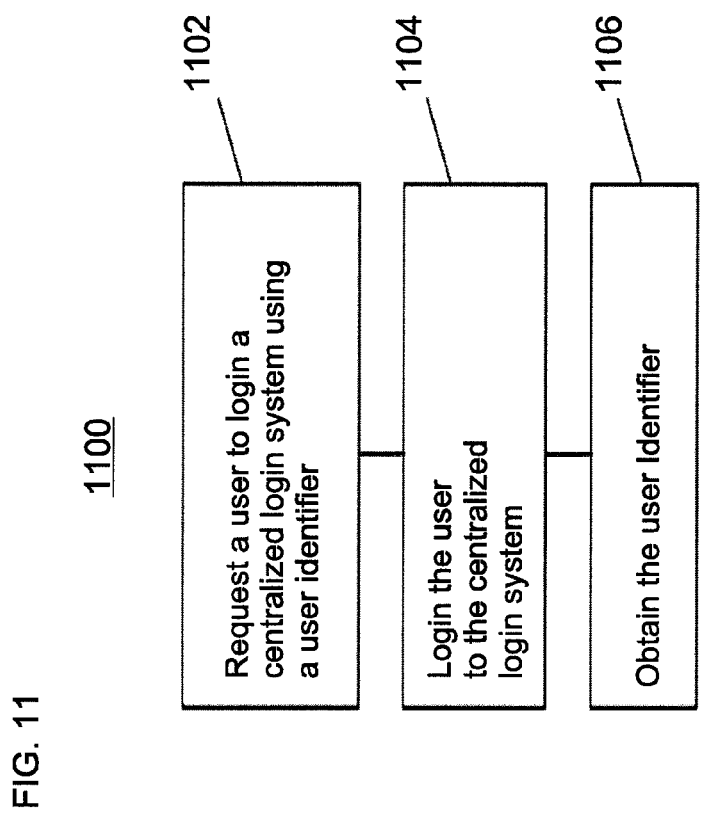
FIG. 11 is a flow diagram illustrating a process for obtaining a user identifier utilizing a centralized login system according to some embodiments.

The embodiments in FIG. 11 illustrate a flow diagram for an exemplary process 1100 of obtaining a unique identifier of a user by utilizing a centralized login system 118 in FIG. 1.

At step 1102, a virtual content request engine 104 of a mobile device requests a user to login the centralized login system 118.

At step 1104, depending on different implementations, the virtual content request engine, 104, a mobile application 105, a browser 106, or the like, accesses the centralized login system to login the user using a user identifier provided.

At step 1106, the virtual content request engine 104 obtains the user identifier.

The embodiments in FIG. 11 ensure that each user is uniquely identified by the obtained user identifier.

Furthermore, in some implementations of FIG. 11, a particular internet-based application account may be used as the centralized login system. Specifically, the virtual content request engine 104 may request the user to login into the particular internet-based application account before accessing mobile applications 105 in a mobile device 101. As a result, the particular internet-based application account login information is obtained as a user identifier to ensure that each user is uniquely identified.

Furthermore, in some other embodiments of FIG. 11, a particular mobile application 105 (or browser 106) may be used as the centralized login system. For example, the virtual content request engine 104 may request the user to login the particular mobile application 105. As a result, a user's login information of the particular application is obtained as a user identifier to ensure that each user is uniquely identified.

Furthermore, in some other embodiments of FIG. 11, if two or more mobile applications 105 installed on a mobile device 101 are able to communicate with each other and share the same login information of a user using the applications, the two or more mobile applications 105 may be used as the centralized login system. For example, a plurality of mobile applications may be developed by an application developer. When a user logs in to one of the plurality of mobile applications and invokes another of the plurality of applications, the user's login information is transferred (for instance, from a server of the developer) to another of the plurality of mobile applications. As a result, a user's login information of the plurality of applications is obtained as a user identifier to ensure that each user is uniquely identified.

As discussed above with respect to FIG. 3, obtained user identifier is preferably processed with a hash function by the virtual content request engine 104 in order to protect individual users by removing specific identity information of a device, a user or an application program.

By utilizing a user identifier, the same advantageous aspects discussed with respect to FIG. 3 and FIG. 6 to FIG. 10 above is applicable to every user of a mobile device. For instance, by utilizing a user identifier in the exemplary process 600 illustrated in FIG. 6, virtual content providers are ensured that their particular virtual content will reach to every user for a predetermined number of times.

Another modification to the embodiments described with respect to FIG. 3, and FIG. 6 to FIG. 10 is to use a user identifier and an application identifier, each of which is obtained in the same manner as discussed above. The user identifier and application identifier are utilized in the same manner as the exemplary processes described with respect to FIG. 3, and FIG. 6 to FIG. 10 above.

As discussed above with respect to FIG. 3, one or both of the obtained user identifier and application identifier may be processed with a hash function by the virtual content request engine 104 in order to protect individual users by removing specific identity information of a device, a user or an application program.

By utilizing a user identifier and an application identifier, the same advantageous aspects discussed with respect to FIG. 3 and FIG. 6 to FIG. 10 above is applicable to every user of a mobile device. For instance, by utilizing a user identifier and an application identifier in the exemplary process 600 illustrated in FIG. 6, virtual content providers are ensured that their particular virtual content will reach every user using a particular application on a mobile device for a predetermined number of times.

Another modification to the embodiments described with respect to FIG. 3, and FIG. 6 to FIG. 10 is to use a user identifier and a device identifier, each of which is obtained in the same manner as discussed above. The user identifier and the device identifier are utilized in the same manner as the exemplary processes described with respect to FIG. 3, and FIG. 6 to FIG. 10 above.

As discussed above with respect to FIG. 3, one or both of the obtained user identifier and device identifier may be processed with a hash function by the mobile application 105 in order to protect individual users by removing specific identity information of a device, a user or an application program.

By utilizing a user identifier and a device identifier, the same advantageous aspects discussed with respect to FIG. 3 and FIG. 6 to FIG. 10 above is applicable to every user of a particular mobile device. For instance, by utilizing a user identifier and a device identifier in the exemplary process 600 illustrated in FIG. 6, virtual content providers are ensured that their particular virtual content will reach every user using a particular mobile device for a predetermined number of times.

Another modification to the embodiments described with respect to FIG. 3, and FIG. 5 to FIG. 9 is to use a user identifier, a device identifier and an application identifier, each of which is obtained in the same manner as discussed above. The user identifier, the device identifier and the application identifier are utilized in the same manner as the exemplary processes described with respect to FIG. 3, and FIG. 6 to FIG. 10 above.

As discussed above with respect to FIG. 3, one or more of the obtained user identifiers, device identifier and application identifier may be processed with a hash function by the mobile application 105 in order to protect individual users by removing specific identity information of a device, a user or an application program.

By utilizing a user identifier, a device identifier and an application identifier, the same advantageous aspects discussed with respect to FIG. 3 and FIG. 6 to FIG. 10 above is applicable to every user using a particular mobile application on a particular mobile device. For instance, by utilizing a user identifier, a device identifier and an application identifier in the exemplary process 600 illustrated in FIG. 6, virtual content providers are ensured that their particular virtual content will reach every user using a particular mobile application on a particular mobile device for a predetermined number of times.

The discussions of the embodiments and the modifications of the embodiments above refer to virtual content providers and virtual content, which may be any type of virtual content providers and virtual content, including, for example, advertisers and advertising content.

Furthermore, the concepts of the present invention are aimed to improve a user's experience of accessing information and/or using applications on a mobile device by ensuring that potentially desirable virtual content is served to the user and/or the mobile device, However, in some cases the features created by the concepts of the present invention may not be desirable to a user. Thus, a user will be allowed to opt-in or opt-out of the features created by the concepts of the present invention. For example, a user may opt-out of permitting his or her account information (e.g. user identifier, mobile device identifier and/or application identifier) from being used by the inventive concepts.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Although this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, although operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention being thus described, it will be obvious that the same may be varied in many ways. Such variations are not to be regarded as a departure from the spirit and scope of the invention, and all such modifications as would be obvious to one skilled in the art are intended to be included with the scope of the following claims.

What is claimed is:

1. An apparatus for identifying virtual content candidates to ensure delivery of virtual content, comprising:
   a memory device storing virtual content, each virtual content being associated with a stored target identification, a content identifier and a number of times served;
   said memory device further includes frequency-based reach criteria specifying frequency guarantee for at least one virtual content stored in the memory, wherein frequency-based reach criteria is based on a number of requests for content received from each device; and
   a server operatively connected to said memory device, said server receiving a virtual content request and a received target identification from a device via a network, wherein the received target identification uniquely identifies at least one of the device, a user of the device and an application installed on the device making the virtual content request,
   said server identifying one or more virtual content candidates from the memory device by comparing the received target identification to the stored target identification in the memory device, using one or more frequency-based reach criteria.

2. The apparatus of claim 1,
   further comprising
   said server tracking frequency information relating to an identification frequency of the identified virtual content candidates,
   said server determining one or more virtual content final candidates from the identified virtual content candidates by comparing the tracked identification frequency information against one or more frequency-based reach criteria.

3. The apparatus of claim 1,
   further comprising
   a virtual content selection engine selecting one or more selection candidates from among the virtual content candidates identified by said server and providing the selection candidates to the device via the network,
   said server tracking frequency information relating to a selection frequency of the virtual content,
   said server further identifying the one or more virtual content candidates from the memory by comparing the tracked selection frequency information against one or more frequency-based reach criteria.

4. The apparatus of claim 1, wherein
   said stored target identification includes a stored device identifier, and
   said received target identification includes a received device identifier,
   said server identifying one or more virtual content candidates from the memory by comparing the received device identifier to the stored device identifier.

5. The apparatus of claim 4, wherein
   said stored target identification includes a stored application identifier, and
   said received target identification includes a received application identifier,
   said server identifying one or more virtual content candidates from the memory by comparing the received device identifier and the received application identifier to the stored device identifier and the stored application identifier, respectively.

6. The apparatus of claim 1, wherein
   said stored target identification includes a stored user identifier, and
   said received target identification includes a received user identifier,
   said server identifying one or more virtual content candidates from the memory by comparing the received user identifier to the stored user identifier.

7. The apparatus of claim 6, wherein
   said stored target identification includes a stored application identifier, and
   said received target identification includes a received application identifier,
   said server identifying one or more virtual content candidates from the memory by comparing the received user identifier and the received application identifier to the stored user identifier and the stored application identifier, respectively.

8. The apparatus of claim 7, wherein
   said stored target identification includes a stored device identifier, and
   said received target identification includes a received device identifier,
   said server identifying one or more virtual content candidates from the memory by comparing the received user identifier, the received application identifier, and the received device identifier to the stored user identifier, the stored application identifier, and the stored device identifier, respectively.

9. The apparatus of claim 2, wherein the memory further includes a maximum number of times to be served as the frequency-based reach criteria, the number of times served being the tracked identification frequency information.

10. The apparatus of claim 2, wherein the frequency-based reach criteria includes a sequential request number, and the tracked identification frequency information includes a request number.

11. The apparatus of claim 1, wherein said received device identifier is hashed.

12. The apparatus of claim 1, wherein said virtual content is advertisement content.

13. A non-transitory computer-readable medium having computer-executable instructions, which, when executed by a computer having one or more processors, cause the computer to perform steps of:

storing virtual content, each virtual content being associated with a stored target identification, a content identifier and a number of times served;

storing frequency-based reach criteria specifying frequency guarantee for at least one virtual content, wherein frequency-based reach is based on a number of requests for content received from each device;

receiving a virtual content request and a received target identification from a device via a network, wherein the received target identification uniquely identifies at least one of the device, a user of the device and an application installed on the device making the virtual content request; and identifying one or more virtual content candidates by comparing the received target identification to the stored target identification using one or more frequency-based reach criteria.

14. The non-transitory computer-readable medium of claim 13, said computer-executable instructions, which, when executed by the computer, cause the computer to perform additional steps of:

tracking frequency information relating to an identification frequency of the identified virtual content candidates; and determining one or more virtual content final candidates from the identified virtual content candidates by comparing the tracked identification frequency information against one or more frequency-based reach criteria, said frequency-based reach criteria specifying a frequency guarantee for at least one virtual content.

15. The non-transitory computer-readable medium of claim 13, said computer-executable instructions, which, when executed by the computer, cause the computer to perform additional steps of:

selecting one or more selection candidates from among the virtual content candidates identified and providing the selection candidates to the device via the network;

tracking frequency information relating to a selection frequency of the virtual content; and identifying the one or more virtual content candidates by comparing the tracked selection frequency information against one or more frequency-based reach criteria, said frequency-based reach criteria specifying a frequency guarantee for at least one virtual content.

16. A method for identifying virtual content candidates to ensure delivery of virtual content, comprising steps of:

storing virtual content, each virtual content being associated with a stored target identification, a content identifier and a number of times served;

storing frequency-based reach criteria specifying frequency guarantee for at least one virtual content, wherein frequency-based reach criteria is based on a number of requests for content received from each device;

receiving a virtual content request and a received target identification from a device via a network, wherein the received target identification uniquely identifies at least one of the device, a user of the device and an application installed on the device making the virtual content request; and identifying one or more virtual content candidates by comparing the received target identification to the stored target identification using one or more frequency-based reach criteria.

17. The method of claim 16, further comprising steps of:

tracking frequency information relating to an identification frequency of the identified virtual content candidates; and determining one or more virtual content final candidates from the identified virtual content candidates by comparing the tracked identification frequency information against one or more frequency-based reach criteria.

18. The method of claim 16, further comprising steps of:

selecting one or more selection candidates from among the virtual content candidates identified and providing the selection candidates to the device via the network;

tracking frequency information relating to a selection frequency of the virtual content; and identifying the one or more virtual content candidates by comparing the tracked selection frequency information against one or more frequency-based reach criteria.

19. The method of claim 17, wherein the frequency-based reach criteria includes a maximum number of times to be served, and the tracked identification frequency information includes the number of times served.

20. The apparatus of claim 17, wherein the frequency-based reach criteria includes a sequential request number, and the tracked identification frequency information includes a request number.

21. The method of claim 16, wherein frequency-based reach criteria includes guaranteeing a specific virtual content is displayed on a specific request count.

22. The method of claim 16, wherein frequency-based reach criteria includes guaranteeing a specific virtual content is displayed a particular amount of times given a specific number of requests.

* * * * *